United States Patent
Calkin et al.

(10) Patent No.: US 6,828,517 B2
(45) Date of Patent: Dec. 7, 2004

(54) POSITION ENCODER

(75) Inventors: Bobby G. Calkin, Ogden, UT (US); Craig R. Bailey, Mantua, UT (US); James A. Elzey, Fruit Heights, UT (US)

(73) Assignee: Bourns, Inc., Riverside, CA (US)

( * ) Notice: Subject to any disclaimer, the term of this patent is extended or adjusted under 35 U.S.C. 154(b) by 190 days.

(21) Appl. No.: 09/859,838

(22) Filed: May 16, 2001

(65) Prior Publication Data

US 2002/0170812 A1 Nov. 21, 2002

(51) Int. Cl.[7] .................................................. H01H 9/30
(52) U.S. Cl. ............................. 200/11 DA; 200/11 D; 200/16 D; 200/4
(58) Field of Search .................... 200/11 DA, 11 R, 200/11 G, 11 D, 16 C, 16 D, 11 K, 11 TW, 4

(56) References Cited

U.S. PATENT DOCUMENTS

| | | | | |
|---|---|---|---|---|
| 4,922,063 A | * | 5/1990 | Shimizu et al. | 200/11 R |
| 5,155,306 A | * | 10/1992 | Iijima et al. | 200/11 DA |
| 5,418,341 A | * | 5/1995 | Sato | 200/11 R |
| 6,194,673 B1 | * | 2/2001 | Sato et al. | 200/4 |
| 6,248,964 B1 | * | 6/2001 | Bailey et al. | 200/11 DA |

* cited by examiner

*Primary Examiner*—Kyung Lee
(74) *Attorney, Agent, or Firm*—Christie, Parker & Hale, LLP

(57) ABSTRACT

A switching element for a rotary or linear encoder which generates pulse signals indicative of rotary or linear position, and direction and rate of change of such position. The invention is characterized by use of a patterned and cured solder-mask material which defines insulated or non-conductive surfaces, with a pattern of conductive wiper-contacting segments therebetween. The invention enables fast and economical fabrication as compared to known encoder switching elements.

5 Claims, 3 Drawing Sheets

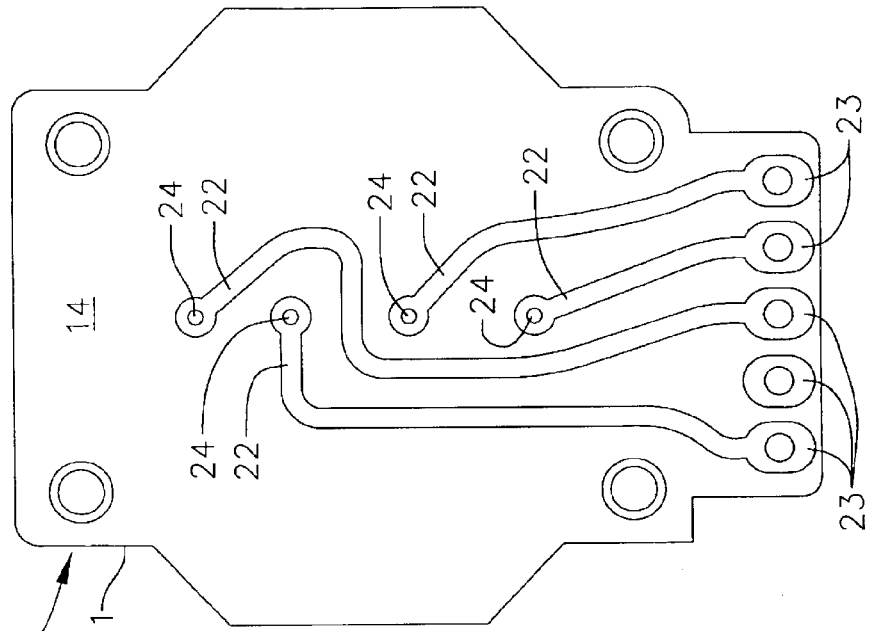
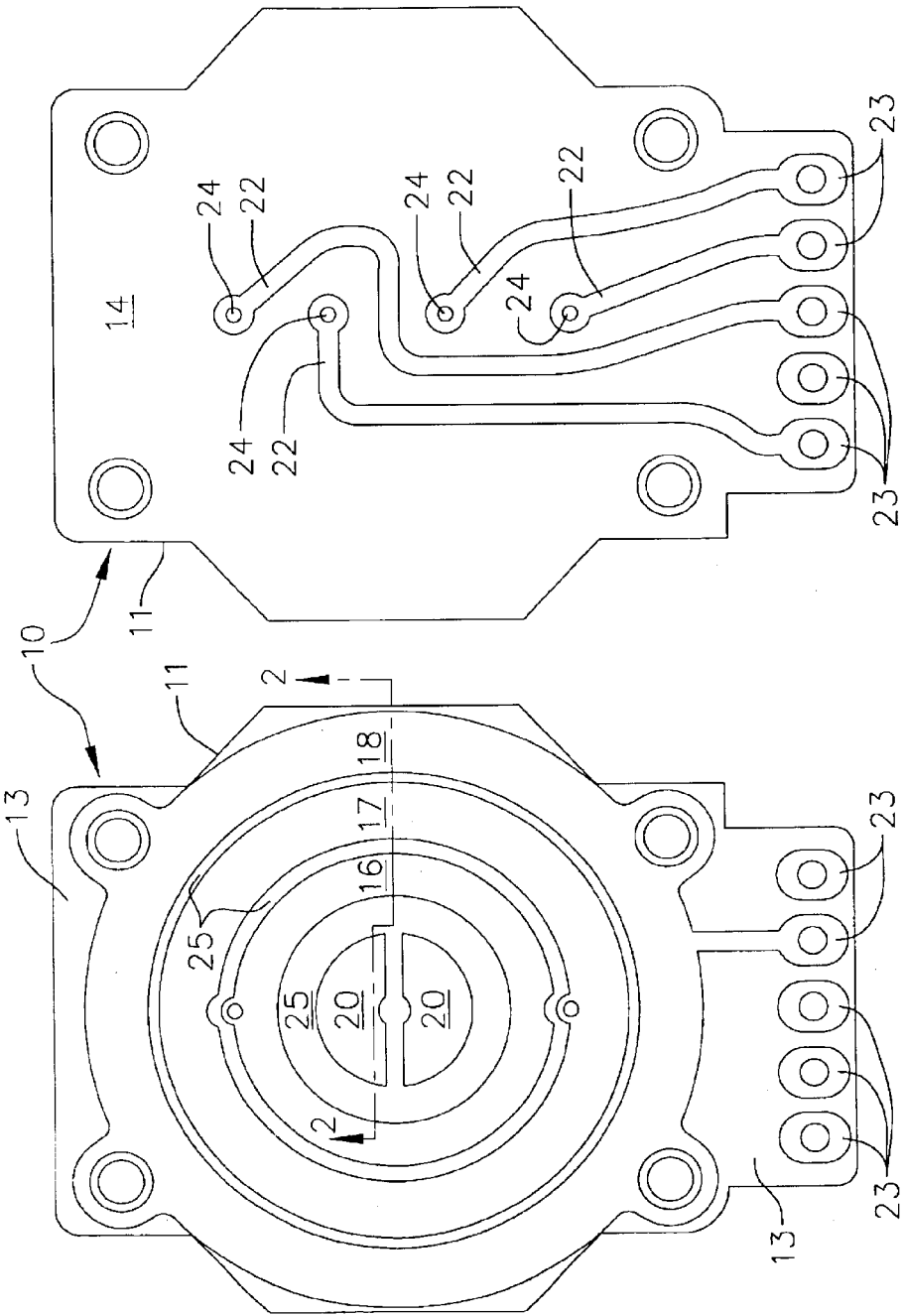

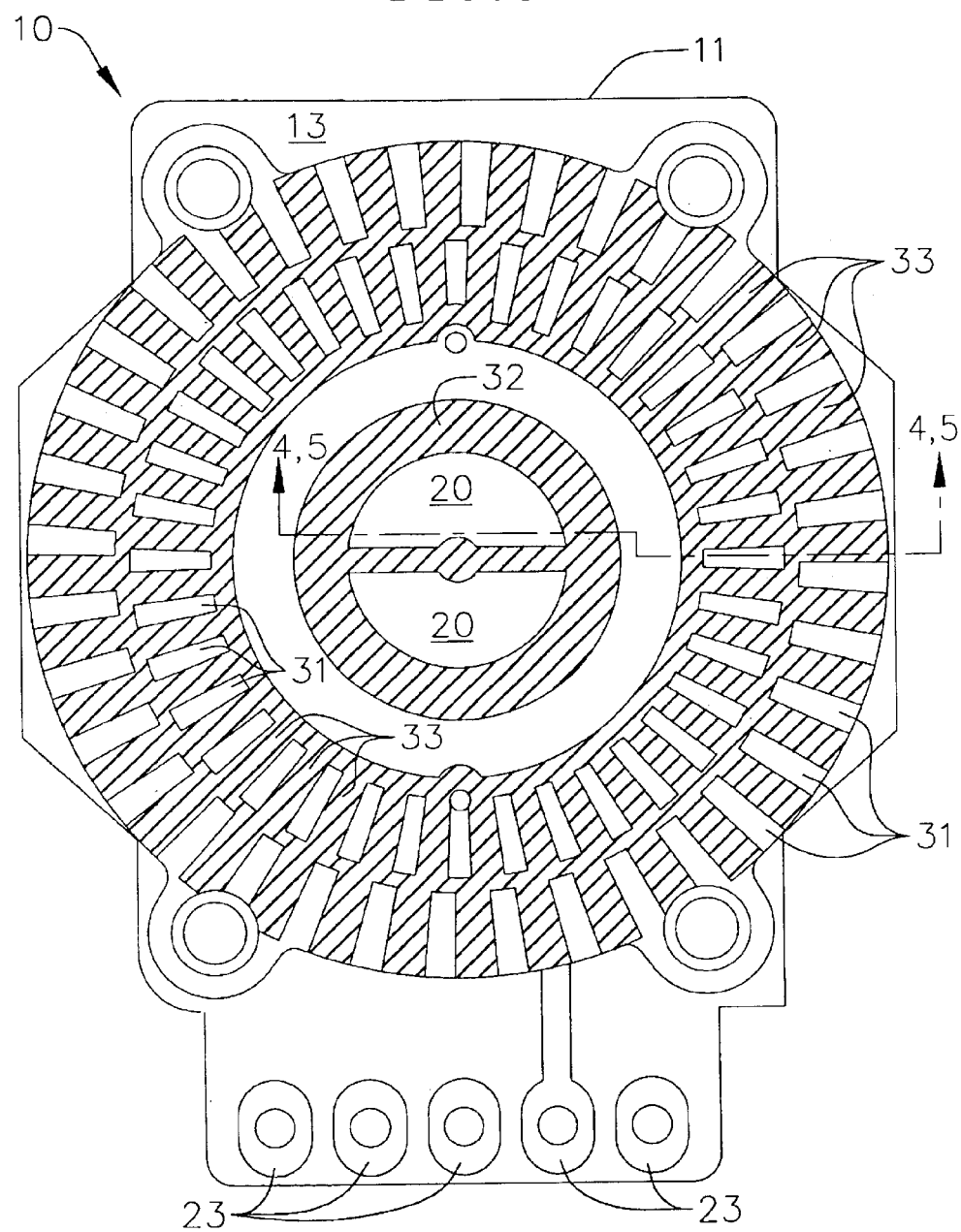

POSITION ENCODER

BACKGROUND OF THE INVENTION

This invention relates to a switching element useful in encoders for detecting and measuring rotary or linear displacements, and the velocity and direction of such displacements. An important application of these devices is in monitoring of angular shaft position, direction and speed. Encoders of this type have been known for many years, and they typically generate a train of pulses, one pulse corresponding to a specific small angular or linear displacement, with the pulse rate corresponding to angular or linear velocity.

The pulses are formed by angular or linear movement of one or more contact wipers along and against a switching element having alternating conductive and nonconductive zones. It is important that the transitions between conductive and nonconductive zones be smooth to avoid wiper bounce, and to minimize switching-element and wiper wear for long service life of the encoder.

Known techniques for making such switching elements involve various plating and material-deposition procedures often requiring one or two passes of the elements under construction through a high-temperature oven for material curing and other processes. Each process requires considerable time (typically 30-to-60 minutes) which substantially increases production time and expense. The present invention is a "no pass" technique which provides a highly satisfactory switching element without lengthy curing time in a high-temperature oven.

SUMMARY OF THE INVENTION

The encoder switching element of this invention is characterized by an encoding track formed on a base, the track having alternating conductive and nonconductive segments, the nonconductive segments being a cured solder-mask material. The conductive segments have wiper-contacting surfaces which are preferably gold, and which are in precise alignment and juxtaposition with the nonconductive segments. The invention further includes the process steps of forming a pattern of solder-mask material, and curing the material to define the nonconductive segments.

BRIEF DESCRIPTION OF THE DRAWINGS

FIGS. 1A and 1B are views of the front and rear surfaces of a switching element at a stage prior to formation of alternating conductive and nonconductive zones;

FIG. 3 is a view similar to FIG. 1A, and showing the completed switching element after formation of alternating conductive and nonconductive zones;

The sectional views are not to scale, and are exaggerated in certain vertical dimensions for clarity.

DETAILED DESCRIPTION OF THE PREFERRED EMBODIMENT

FIGS. 1A and 1B show a partially completed switching element 10 having a flat base 11 which is preferably of the insulative type used in conventional printed-circuit (PC) boards. For example, the base may be a fiber-filled epoxy resin, linen, cellulose material, or other well-known types. As is also conventional with PC boards, the upper and lower faces 13 and 14 of the base are initially covered with upper and lower films of conductive copper of about 25–40 microns thickness. The upper copper film has been masked and photo-etched by conventional methods to form separated concentric rings or annular tracks 16, 17 and 18 on the upper surface of the base. Any number of such rings or tracks may be formed as dictated by the end use of the switching element.

Figure 2:
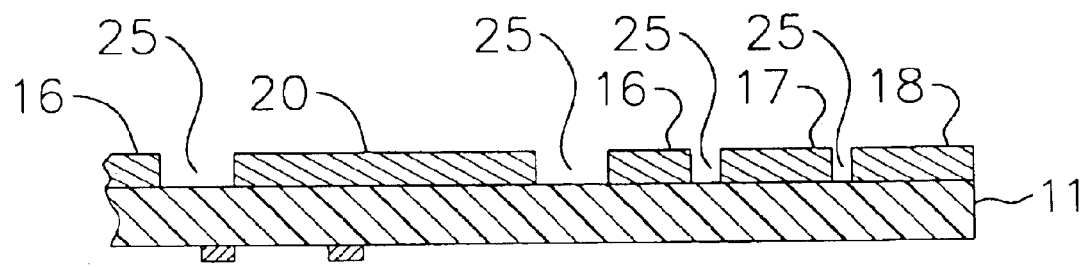
FIG. 2 is a partial sectional view on line 2—2 of FIG. 1A.

A pair of switch contacts 20 may be optionally formed in the center of the array of tracks. The copper film on lower face 14 has been similarly masked and photo-etched to form conductive traces 22 to provide electrical connection of tracks 16–18 and contacts 20 with terminals 23 at one edge of the base. The tracks are conventionally connected to the tracks and contacts by conductive vias 24. As shown in FIG. 2, the conductive surfaces are electrically isolated from one another by nonconductive gaps 25 therebetween where the copper film has been removed by the photo-etching process.

Figure 4:
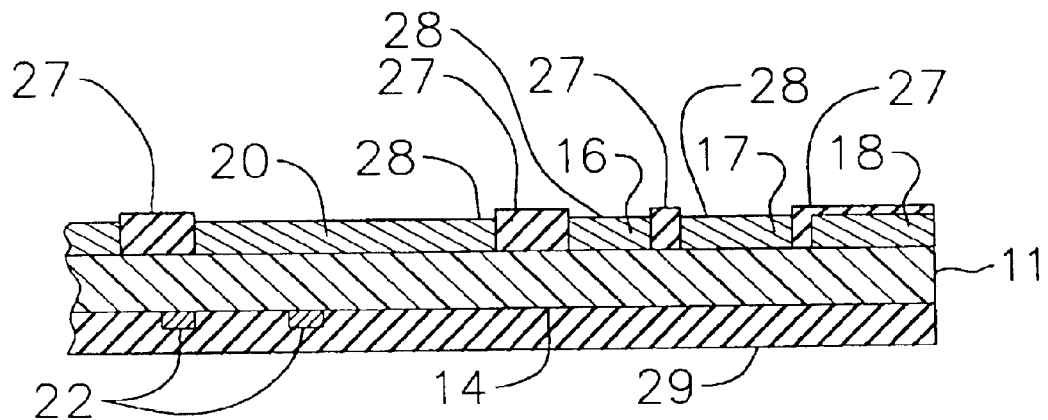
FIG. 4 is a partial sectional view on line 4—4 of FIG. 3.

The upper face of the base and the conductive copper rings are then covered with a level layer of conventional solder-mask material. The uncured material is then covered with a mask, and exposed areas of the material are cured to a hard, tough and flat insulative surface 27 as shown in FIG. 4. Unexposed and uncured areas of the material are then completely removed by a water or acid rinse, leaving portions 28 of the underlying conductive copper tracks clean and exposed as shown in FIG. 4. Application of the solder-mask material is controlled to form only a thin insulative film over the copper tracks of about several microns thickness. An alternative process is to apply the material through a patterned screen on only the surfaces to be insulated, and then curing the patterned material. If a flat insulated surface is desired on lower face 14, a layer of solder-mask material 29 can be similarly deposited and cured as shown in FIG. 4.

Figure 5:
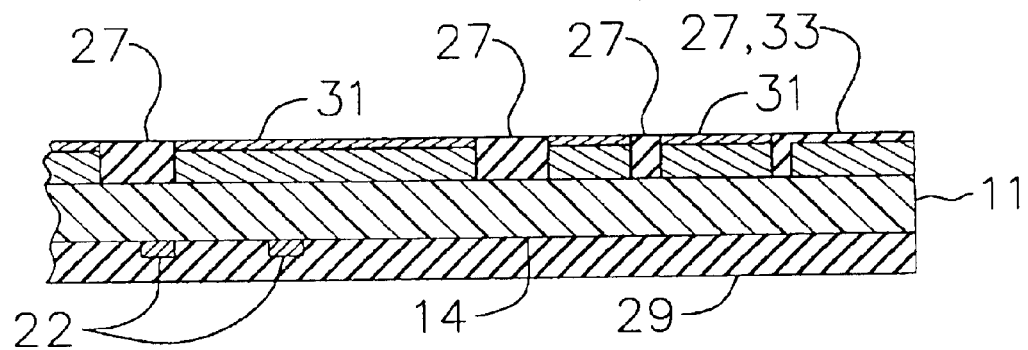
FIG. 5 is a sectional view similar to FIG. 4, and showing plated conductive zones.

The resulting exposed conductive copper segments are then plated with a nickel coating of several microns thickness, followed by a film, preferably gold, of about 0.25-micron thickness to form wiper-contacting conductive segments 31 on tracks 17 and 18, and conductive surfaces 32 on the other exposed copper surfaces as shown in FIG. 5. The plating process is controlled to "grow" the smooth and noncorrosive nickel-gold layer in abutting relation with the sides, and substantially exactly level with the upper surface of the adjacent solder-mask nonconductive zones.

The upper face of the completed switching element 10 is shown in FIG. 3. Annular tracks 17 and 18 now define circular patterns of alternating conductive and nonconductive segments 31 and 33, the conductive segments of the two tracks being out of radial alignment as is conventional in rotary encoders. The surfaces of the tracks are very smooth, but with well-defined margins between the conductive and nonconductive segments.

The invention has been described in terms of a switching element for a rotary or shaft-position encoder, but is equally useful in linear encoders where the alternating conductive and nonconductive zones are arranged in linear patterns. The invention enables fast and accurate fabrication of switching elements, and very little or no horizontal or vertical displacement between the conductive and nonconductive zones. Wiper bounce is substantially eliminated, as is wear of the switching element and wiper.

What is claimed is:

1. A switching element for an encoder, comprising a base, and at least one encoding track on the base, the encoding track having serially arranged conductive segments which are separated by nonconductive segments of a solder-mask material, interfaces of the conductive and nonconductive segments being substantially flat and smooth.

2. The switching element of claim 1 in which the encoding track is circular.

3. The switching element of claim 1, and further comprising at least one additional encoding track, the tracks being concentric and circular, and radially spaced apart.

4. The switching element of claim 1 in which the conductive segments have an exposed wiper-contacting surface which is gold.

5. A method for making a switching element for an encoder, the switching element having an encoding track with serially arranged and alternating conductive and nonconductive segments, comprising the steps of forming the nonconductive segments by depositing a patterned array of a solder-mask material defining the nonconductive segments, and subsequently curing the material, followed by plating the conductive segments with nickel, and then gold to raise the conductive segments to the same height as the nonconductive solder-mask segments, whereby the interfaces between the conductive and nonconductive segments are substantially flat and smooth.

* * * * *